S. Z. DE FERRANTI.
SPINNING, TWISTING, AND DOUBLING MACHINERY.
APPLICATION FILED SEPT. 7, 1910.
Reissued July 25, 1911.
13,276.
3 SHEETS—SHEET 1.
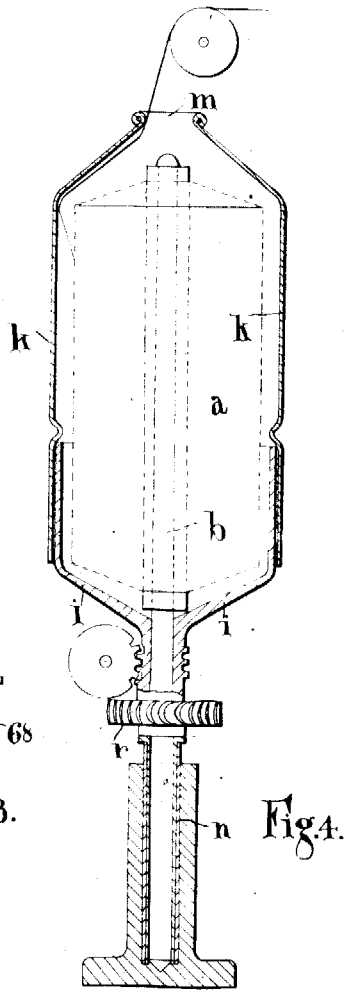
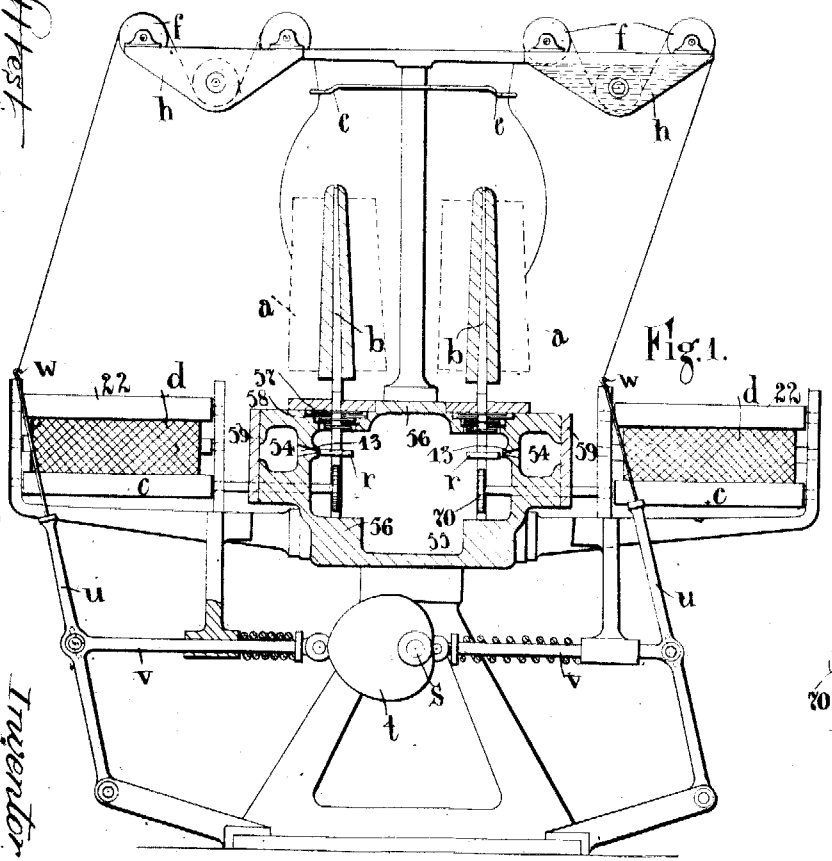
Attest.
Bert. M. Stahl.
Edward N. Sartor
Inventor.
Sebastian Z. de Ferranti.
by Spear, Middleton, Donaldson & Spear.
Attys.

S. Z. DE FERRANTI.
SPINNING, TWISTING, AND DOUBLING MACHINERY.
APPLICATION FILED SEPT. 7, 1910.
Reissued July 25, 1911.
13,276.
3 SHEETS—SHEET 2.
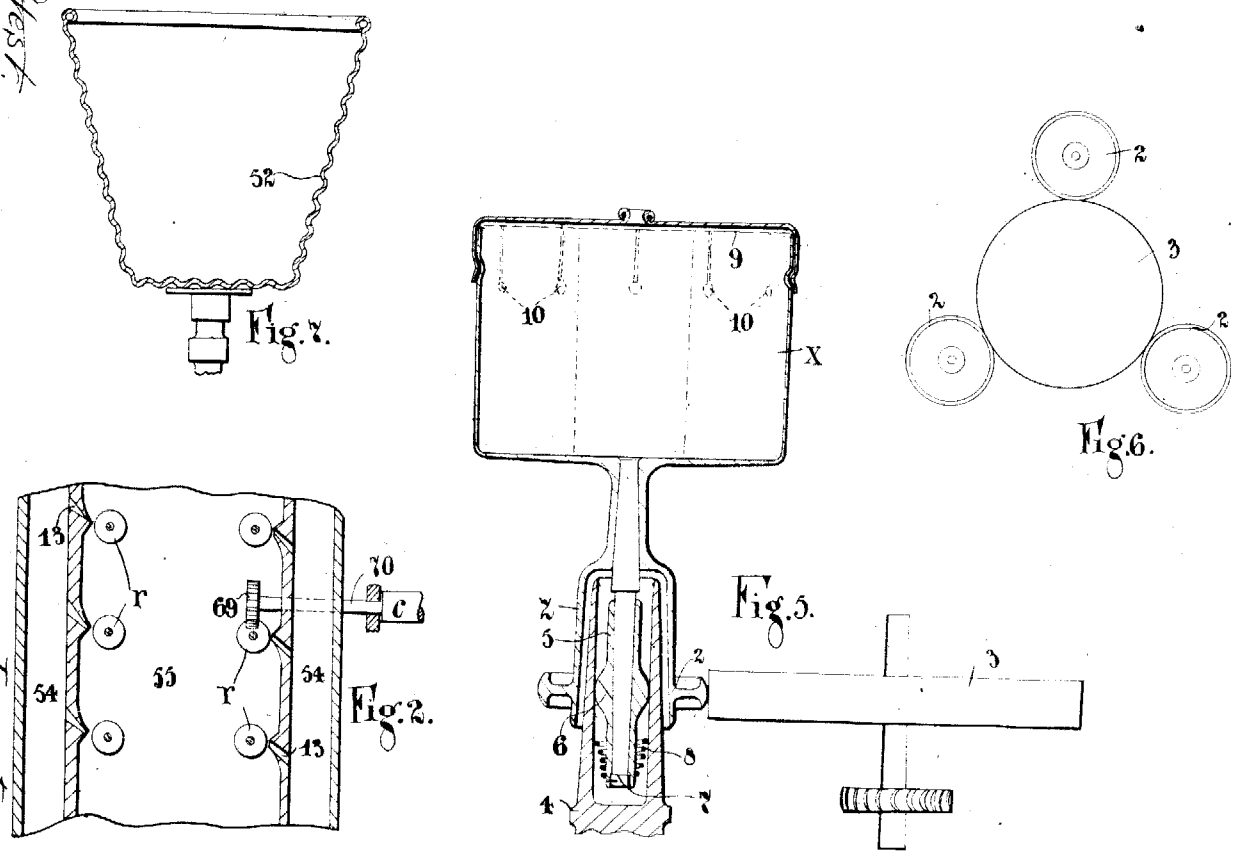
Attest.
Ben. W. Hahl.
Edward N. Santa
Inventor.
Sebastian Z. de Ferranti
by Spear, Ludlow & Donaldson & Spear
Attys.

S. Z. DE FERRANTI.
SPINNING, TWISTING, AND DOUBLING MACHINERY.
APPLICATION FILED SEPT. 7, 1910.
Reissued July 25, 1911.
13,276.
3 SHEETS—SHEET 3.
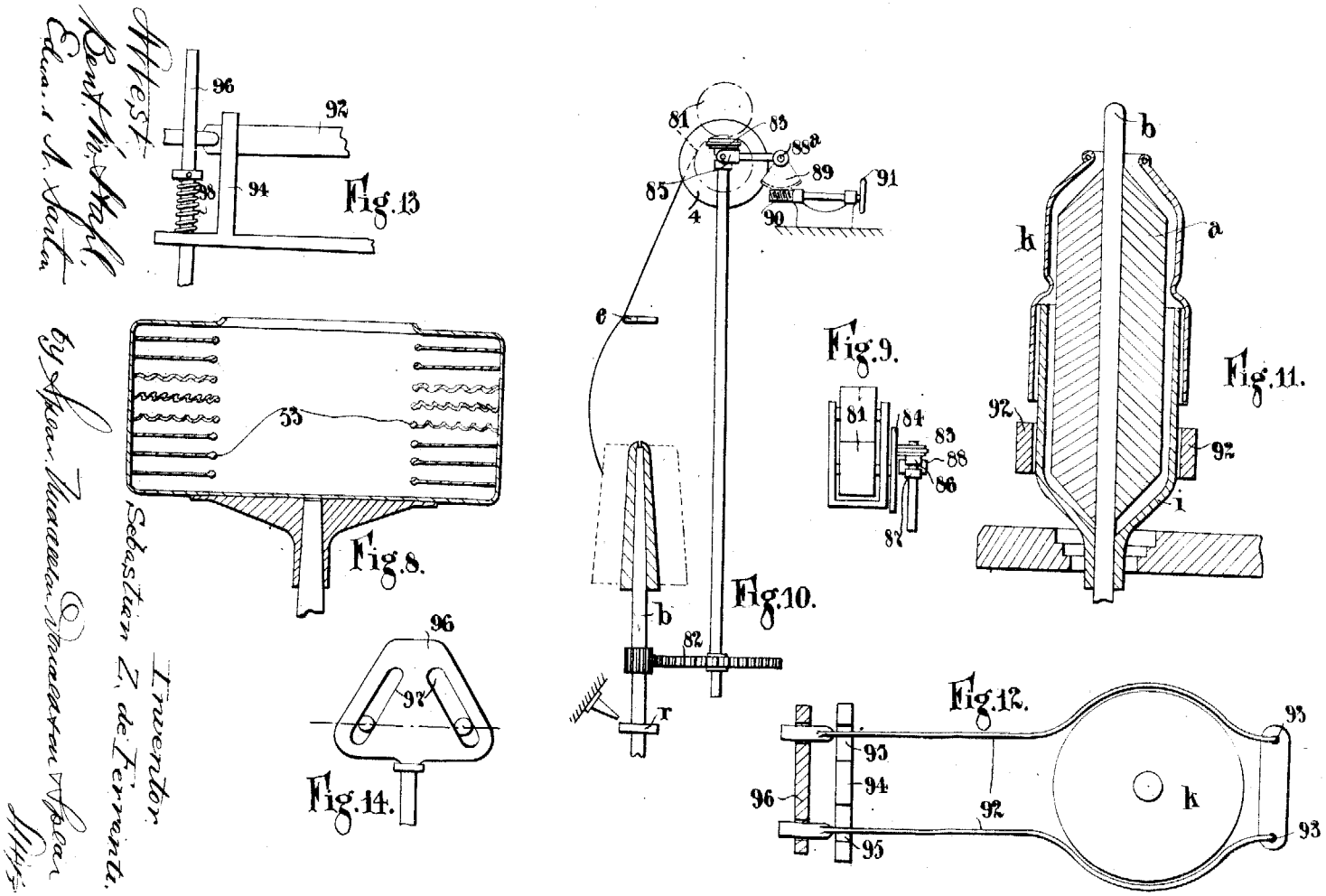
Witness
Bert. W. Stahl,
Edwa. N. Sarton
Inventor
Sebastian Z. de Ferranti.
by Spear, Mudge & Conley & Spear
Attys

UNITED STATES PATENT OFFICE.

SEBASTIAN ZIANI DE FERRANTI, OF GRINDLEFORD, ENGLAND.

SPINNING, TWISTING, AND DOUBLING MACHINERY.

13,276. Specification of Reissued Letters Patent. Reissued July 25, 1911.

Original No. 927,343, dated July 6, 1909, Serial No. 221,295. Application for reissue filed September 7, 1910. Serial No. 580,941.

*To all whom it may concern:*

Be it known that I, SEBASTIAN ZIANI DE FERRANTI, a subject of the King of Great Britain and Ireland, and residing at Grindleford, in the county of Derby, England, (late of 31 Lyndhurst road, Hampstead, London, N. W., England,) have invented certain new and useful Improvements in and Relating to Spinning, Twisting, and Doubling Machinery, of which the following is a specification.

The invention relates to textile machinery of the continuous spinning type as opposed to the mule type in which the spinning is intermittent. Hitherto such machines whether used for spinning, twisting, doubling or similar operations (hereinafter referred to generically as "twisting") have been built so far as regards the operative action of continuous twisting with either (*a*) all their twisting elements proper interconnected or with (*b*) all their feed rolls interconnected or with (*c*) all the twisting elements and feed rolls interconnected and driven from a common source.

The actual operation of twisting has been effected in many different classes of machine, such for example as ring spinners, cup spinners, flier frames and so forth but in all cases the material has been transferred by feed rolls, draw-off rolls or otherwise from one bobbin, cup or other element constituting means for holding the material to another bobbin, cup or other element constituting means for receiving the material the twist being imparted to the material during such transfer in order that it may be uniformly distributed over a long length of material or in other words in order that the operation may be continuous so long as the material to be twisted lasts. The traverse mechanism for evenly laying the material in these machines performs a subsidiary function of only secondary importance as compared with the primary operative function of continuously twisting the material; as a rule, however, the traverse mechanism has been operated from a common source throughout the machine and in the present invention this feature is preferably retained. The large amount of gearing inherent in the design of such machines has been one of the prime factors involved in limiting their working speed to the 8,000 or 9,000 revolutions a minute practicable at the present time and it is the main object of the present invention to increase the working speeds and to render speeds as high as 20,000 revolutions a minute or upward practicable.

To this end the present invention consists broadly in a machine of the type indicated divided into a plurality of continuously operating twisting units mechanically independent from one another as regards their operative action.

Each unit in the improved machines preferably includes only a single spindle or other twisting element but as will be described hereinafter each unit may comprise a small number of interconnected spindles or the like forming a group.

Other important advantages apart from the possibility of increased speeds accruing from the mechanical independence of the units are that where as in certain of the specific examples to be described each individual twisting element is provided with its own driving motor and connected by a driving connection to its thread-transferring means (*e. g.* feed rolls or draw-off rolls) variations in speed of the different motors do not affect the uniformity of the resultant twist since although the twisting element proper concerned makes more (or less) revolutions in a given time, the length of material transferred is greater (or less) in precisely the same proportion; moreover, if a thread breaks in such forms of the invention, the particular unit in question can be stopped as a whole and less waste results.

Referring now to the accompanying drawings which illustrate the invention and form part of the specification. Figure 1 shows an end view partly in section of a form of doubling machine for twisting by rotating the unwinding bobbins, Fig. 2 being a corresponding sectional plan of the longitudinal passages through which working fluid is led to and from the turbines, and Fig. 3 a view in detail showing the gearing between the main and draw-off spindles. Fig. 4 is a detail view showing the bobbin surrounded by an anti-ballooning cup. Fig. 5 is a view of a self-balancing cup flexibly supported. Fig. 6 showing an example of group driving. Figs. 7 and 8 show forms of spinning cups with devices for preventing the material from slipping. Figs. 9 and 10 show elevations of a device for simultaneously varying the feed to a set of spindles, while Figs. 11 to 14 shew forms of breaking mechanism.

When desirable the same reference symbols are used in the different drawings to denote corresponding parts.

I wish it to be understood that the drawings accompanying and forming part of this specification are of a diagrammatic nature and are not intended to give such working details as are common knowledge to those skilled in the art.

In carrying the invention into effect according to one form as applied to a machine in which the material, *a*, is twisted while being drawn-off from bobbins, *b*, on which it has been previously wound, the spindle of each bobbin is provided with a turbine, *r*, and also with a worm, 68, gearing into a worm wheel, 69, on the shaft, 70, (see Figs. 1, 2 and 3). This shaft, 70, carries a roll, *e*, which acts in conjunction with the receiving bobbin, *d*, to draw-off the material from the holding bobbin, *k*, by way of the guide eye, *c*, rolls, *f*, and damping trough, *h*. An additional roll, 22, serves to keep the rolls, *e* and *d*, in operative engagement. The machine thus comprises a series of mechanically independent units each acting to perform the essential operation of continuous twisting or in other words each acting continuously to transfer fibrous material from suitable holding means to suitable receiving means and to twist it during such transfer.

Turning now to the structural details and functioning of the framework or base which serves to support the units, the driving medium (which may be a light hydrocarbon oil such as paraffin) passes under pressure by way of the longitudinal channels, 54, to the nozzles, 13, and is drawn off through the tail race, 55, these various parts forming part of the box girder or casing, 56. The arrangement of the turbines and gearing within this casing allows the lubrication to be automatically effected by the driving medium itself. Where the high speed spindle *b*, passes out of the casing, it is fitted with a multiple plate oil baffle, consisting of plates, 57, attached to the spindle and loose plates, 58, sitting in stepped recesses in the main casing and forming the standing part of the baffle: with this arrangement the plates, 58, can be lifted out together with the spindle and plates, 57, which are fixed thereon. Cover plates, 59, may be used if desired in connection with the inlet channels, 54, to allow of access to the nozzles, 13, during manufacture or subsequently.

The parts of the machine so far as described are sufficient, theoretically to enable it to perform its essential operative action of continuous twisting; practically, however, it is necessary to provide some form of traverse means for performing the subsidiary function of evenly laying the twisted material on the receiving bobbin. An example of such mechanism is shown in Fig. 1. A shaft, *s*, actuated from a separate motor or from a line shaft operates a heart-shaped cam, *t*, this cam as it revolves causing the pivoted rods, *u*, through the medium of the links, *v*, to oscillate backward and forward; the yarn passing through eyes, *w*, or guides carried by the rods, *u*, is thus guided on to the bobbin, *d*, in the uniform manner required.

It will be obvious that the details of a machine with separate twisting units may differ widely from those described above without departing from the spirit of my invention. Certain examples of such modifications will now be described. Thus in order to prevent or minimize ballooning, I may surround the bobbin, *a*, from which the material is drawn by a cup, *i*, which should be clear of the bobbin in its fully wound condition. The cup, *i*, which at its lower end is carried by the spindle, *b*, may be fitted with a lid, *k*, having a hole, *m*, in it of considerably less diameter than the inside of the lid. The spindle is shown as mounted in a well-known form of bearing having concentric sleeves, *n*. the film of lubricant between these sleeves providing sufficient side-play to allow the spindle to run true at high speed. When the bobbin on its spindle according to this device is revolved at high speed for the purpose of twisting the material, centrifugal force acts to throw off the outside or last turn against the inside of the cup, *i*, or the lid, *k*, the part concerned thus forming an antiballooning device, while the material is drawn off from the top of the lid close to the axis of revolution by the draw-off rolls. Again instead of drawing the material from a bobbin such as *a*, mounted on a spindle, *b*, I may draw it out of a cup such as *x*, (see Fig. 5) in which it has been previously deposited by any suitable means. When the material is drawn through a lid, 9, on the cup, a method of working which is useful to prevent excessive ballooning or whipping of the yarn, the lid, 9, may be loosely slipped on to the cup and fixed by means of centrifugal action to the edge of the cup, which may be suitably provided with slits, 10, as shown to produce this effect.

The cup, *x*, is preferably formed by drawing or metal-spinning out of thin sheet metal and may be mounted on a spindle provided with an outer sleeve, *z*, or the like on which a friction wheel, 2, is mounted; this wheel, 2, may be driven from a second wheel 3, on the spindle of which a turbine may be arranged. The sleeve, *z*, passes outside a fixed hollow element, 4, while a sleeve, 5, fitted on the spindle and provided with a spherical enlargement, 6, passes within the hollow element. The weight of the spindle and attached parts is taken by a footstep bearing, consisting according to one convenient form of a block or plug, 7, secured by any suitable means in the bottom of the bearing member, 5, which itself is yieldingly supported by the spring, 8, one end of which is suitably fixed to the hollow element, 4, the other end being attached to the bearing member itself. The cup is thus flexibly supported in a bearing which can adjust itself at high speeds until the axis of rotation passes through its center of mass in accordance with well-known principles and this fact taken in conjunction with the continuous periphery of the cup itself renders this modification very suitable for application to a separate unit machine.

As shown diagrammatically in Fig. 6, the one friction wheel, 3, may transmit power to a plurality of spindles having friction wheels, 2, arranged circumferentially around it; such a small group of spindles forming a unit may be substituted for the units each consisting of a single spindle shown in Fig. 1, which latter arrangement, however, I find preferable in most cases.

In another known process of spinning according to which the material instead of being twisted while being drawn out of a cup, is twisted while being introduced into a cup, I may as shown in Fig. 7, form the inside of the cup with a corrugated surface, 52, or (see Fig. 8) I may provide the cup with a series of rings or shelves, 53, projecting into the cup or again the shelves themselves may receive any desired corrugations, serrations or projections such for instance as those indicated in the figure. In all cases the object of the projections is to enable the material to obtain a better grip on the walls of the cup and so lessen the danger of the mass of material (held in place by the action of centrifugal force when the cup is rotating) collapsing if the cup is slowed down or stopped.

When it is desired to vary the number of twists per unit length of material I transfer more or less yarn or doubling through the rolls in relation to the speed of the twisting element proper and I preferably arrange for making the necessary adjustments simultaneously throughout the different separate units of the machine. According to the device shown for this purpose in Figs. 9 and 10, I transmit the motion of each high speed spindle, *b*, to the rolls, 81, through the plain spur gearing, 82, and friction disks, 83 and 84. The small friction disk, 83, is splined on its shaft and may be varied in position by means of the forked lever, 85, the pins, 86, or the like in which engage with the groove, 87, in the enlarged boss, 88, of the friction wheel 83, the lever, 85, being mounted on the shaft, 88ª, and operated by the worm quadrant, 89, worm, 90, and handle, 91. The shaft, 88ª, carries a number of levers or the like corresponding to the spindles the feed to or draw-off from which are to be simultaneously varied and preferably runs the whole length of the spinning frame. The friction wheels operated as described thus constitute a series of variable speed gears for the different units, the velocity ratios of which can be simultaneously and to a like extent varied as desired.

Finally I may provide means for braking each individual unit so that on a thread breaking, for example, the particular unit concerned may be stopped for piecing up purposes. Thus, Figs. 11 to 14 show the application of a suitable brake to, for example, an anti-ballooning cup of the type shown in Fig. 4. It will be seen in Fig. 11 that the bobbin, *a*, is mounted on a spindle, *b*, the brake straps 92, acting on the lower part of the container, *z*, fixed to the spindle.

Referring now to the detail views, the flat brake straps, 92, are indicated as pivoted at 93, to any convenient fixed part of the machine; the other ends of the brake straps are carried in a guide, 94, preferably provided with suitable notches, 95. Those parts of the brake straps beyond the guide in a direction away from the cup are made circular in cross-section and pass through a plate, 96, in which inclined slots, 97, are provided. Any suitable handle or the like is attached to this plate so that it may be lowered and thus cause the ends of the brake straps to approach. A spring, 98, serves to return the plate and thereby to release the cup.

Although I have described in considerable detail one example of a machine and certain modifications of the same to which my invention is applicable, I nevertheless do not intend such detail description to limit the scope of my invention, since, so far as I am aware quite apart from the structural details, I am the first to divide a twisting machine of the type indicated into a number of units mechanically independent from one another as regards their essential operative action of continuous twisting and this feature I desire to claim as broadly as the law allows.

Other processes of twisting known in the textile arts as roving and slubbing may also be carried out with apparatus embodying the principle of division into separate units while not only cotton but all other materials which require analogous treatment may be dealt with in machines according to my invention.

Having now described my invention, what I claim as new and desire to secure by Letters Patent is:—

1. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units; together with means for supporting said units.

2. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units and each of said units including also a driving connection between its motor means and thread-transferring means; together with means for supporting said units.

3. In an apparatus for twisting fibrous material, a plurality of twisting units, each of said units including turbine means and thread-transferring means serving said unit, the turbine means and thread-transferring means of any one of said units being mechanically independent as regards its operative action from the turbine means and thread-transferring means of any other of said units; together with means for supporting said units.

4. In an apparatus for twisting fibrous material, a plurality of twisting units, each of said units including turbine means and thread-transferring means serving said unit, the turbine means and thread-transferring means of any one of said units being mechanically independent as regards its operative action from the turbine means and thread-transferring means of any other of said units, and each of said units including also a driving connection between its turbine means and thread-transferring means; together with means for supporting said units.

5. In an apparatus for twisting fibrous material, a plurality of twisting units, each of said units including a rotatable twisting element, motor means for driving said unit, and means for drawing-off the material to be twisted from said rotatable twisting element, the motor and drawing-off means of any one of said units being mechanically independent as regards its operative action from the motor and drawing-off means of any other of said units; together with means for supporting said units.

6. In an apparatus for twisting fibrous material, a plurality of twisting units, each of said units including a rotatable twisting element, motor means for driving said unit and means for drawing-off the material to be twisted from said rotatable twisting element, the motor and drawing-off means of any one of said units being mechanically independent as regards its operative action from the motor and drawing-off means of any other of said units and each of said units including also a drawing connection between its motor and drawing-off means; together with means for supporting said units.

7. In an apparatus for twisting fibrous material, a plurality of twisting units, each of said units including motor means and thread-transferring means serving said unit, the motor means and thread-transferring means of any one of said units being mechanically independent as regards its operative action from the thread-transferring means of any other of said units and each of said units including also braking means; together with means for supporting said units.

8. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units, and each of said units including also rotatable spinning elements and anti-ballooning devices; together with means for supporting said units.

9. In an apparatus for twisting fibrous material, a plurality of twisting units; each of said units including motor means and thread-transferring means serving said unit, the motor means and thread-transferring means of any one of said units being mechanically independent as regards its operative action from the motor means and thread-transferring means of any other of said units and each of said units including also a rotatable spinning element having self-adjusting bearings; together with means for supporting said units.

10. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units and each of said units including also a spinning chamber having a peripherally continuous portion; together with means for supporting said units.

11. A twisting machine having a series of groups of twisting elements, each of said groups of elements including motor means and thread-transferring means serving said groups, the motor means and thread-transferring means of any of said groups being mechanically independent as regards its operative action from the motor means and thread-transferring means of any other of said groups; together with means for supporting said groups.

12. In an apparatus for twisting fibrous material, a plurality of continuously operating twisting units, each of said units including means for holding fibrous mateal to be twisted, means for receiving fibrous material after being twisted and motor means serving said unit, said units being mechanically independent as regards their operative action, together with means for supporting said units.

13. In an apparatus for twisting fibrous material, a plurality of continuously operating twisting units each of said units including means for holding fibrous material to be twisted, means for receiving fibrous material after being twisted and motor means serving said unit, said units being mechanically independent as regards their operative action; together with traverse means for laying the twisted material and means for driving said traverse means, said driving means being common to a plurality of said units.

14. In an apparatus for twisting fibrous material, a plurality of continuously operating twisting units, each of said units including means for holding fibrous material to be twisted, means for receiving fibrous material after being twisted, means for maintaining a predetermined velocity ratio between said holding and said receiving means and motor means serving said unit, said elements included in any one of said units being mechanically independent as regards its operative action from said elements included in any other of said units together with means for supporting said units.

15. In an apparatus for twisting fibrous material, a plurality of continuously operating twisting units, each of said units including means for holding fibrous material to be twisted, means for receiving fibrous material after being twisted, means for maintaining a predetermined velocity ratio between said holding and said receiving means and motor means serving said unit, said elements included in any one of said units being mechanically independent as regards its operative action from said elements included in any other of said units; together with traverse means for laying the twisted material and means for driving said traverse means, said driving means being common to a plurality of said units.

16. In an apparatus for twisting fibrous material a plurality of continuously operating twisting units each of said units including means for holding fibrous material to be twisted, means for receiving fibrous material after being twisted and motor means serving said unit, said units being mechanically independent as regards their operative action; together with means for simultaneously varying the number of twists per unit length of said material in a plurality of said units.

17. In a machine for twisting fibrous material, the combination of a plurality of continuously operating twisting units mechanically independent from one another as regards their operative action with means for simultaneously varying the number of twists per unit length of said material in a plurality of said units.

18. In a machine for twisting fibrous material, the combination of a plurality of twisting units mechanically independent from one another as regards their operative action, each of said independent units acting to transfer said material from one part of said unit to another part and to twist said material during such transfer; with means for supporting said units.

19. In a twisting machine, a chamber provided with internal projections to prevent collapse of the bobbin spun thereinto.

20. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units together with means for simultaneously varying the rate of transfer in all said units.

21. In an apparatus for twisting fibrous material, a plurality of twisting units, each of said units including motor means and thread-transferring means serving said unit, the motor means and thread-transferring means of any one of said units, being mechanically independent as regards its operative action from the motor means and thread-transferring means of any other of said units; and each of said units including also a driving connection between its motor means and thread-transferring means, said connection including a variable speed gear; together with means for simultaneously operating said gears in all said units.

22. A spinning chamber having internal ridged shelves.

23. A bottomed spinning chamber having internal shelves.

24. A spinning chamber having internal indented shelves.

25. A bottomed spinning chamber having internal indented shelves.

26. A spinning chamber having internal rigid shelves.

27. A bottomed spinning chamber having internal ridged shelves.

28. A spinning chamber having internal shelves concentrically ridged.

29. A bottomed spinning chamber having internal shelves concentrically ridged.

30. A spinning chamber having internal shelves concentrically corrugated.

31. A bottomed spinning chamber having internal shelves concentrically corrugated.

32. A spinning chamber having internal shelves with relatively raised and depressed portion.

33. A bottomed spinning chamber having internal shelves with relatively raised and depressed portion.

34. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units; together with traverse means for evenly laying the twisted material and means for driving said traverse means, said driving means being common to a plurality of said units.

35. In an apparatus for twisting fibrous material, a plurality of twisting units, each of said units including motor means and thread-transferring means serving said unit, the motor means and thread-transferring means of any one of said units being mechanically independent as regards its operative action from the motor means and thread-transferring means of any other of said units, each of said units including also driving connection between its motor means and thread-transferring means; together with traverse means for evenly laying the twisting material and means for driving said traverse means, said driving means being common to a plurality of said units.

36. A twisting machine having a series of groups, each composed of interconnected twisting elements, each of said groups including motor means and thread-transferring means serving said group, the motor means and thread-transferring means of any one of said groups being mechanically independent as regards its operative action from the motor means and thread-transferring means of any other of said groups; together with traverse means for evenly laying the twisted material and means for driving said traverse means, said driving means being common to a plurality of said groups.

37. In an apparatus for twisting fibrous material, a plurality of twisting units, each of said units including means for holding fibrous material to be twisted, means for receiving fibrous material after being twisted, a driving connection between said holding and receiving means and motor means serving said unit, said elements includ in any one of said units being mechanically independent as regards its operative action from said elements included in any other of said units; together with means for supporting said units.

38. In an apparatus for twisting fibrous material, a plurality of twisting units, each of said units including means for holding fibrous material to be twisted, means for receiving fibrous material after being twisted, a driving connection between said holding and receiving means and turbine means serving said unit, said elements included in any one of said units being mechanically independent as regards its operative action from the corresponding elements included in any other of said units, together with means for supporting said units.

39. In an apparatus for twisting fibrous material, a plurality of twisting units, each of said units including means for holding fibrous material to be twisted, means for receiving fibrous material after being twisted, a driving connection between said holding and receiving means and motor means serving said unit, said elements included in any one of said units being mechanically independent as regards its operative action from said elements included in any other of said units; together with traverse means for evenly laying the twisted material and means for driving said traverse means, said driving means being common to a plurality of said units.

40. In an apparatus for twisting fibrous material, a plurality of twisting units, each of said units including means for holding fibrous material to be twisted, means for receiving fibrous material after being twisted, a driving connection between said holding and receiving means and turbine means serving said unit, said elements included in any one of said units being mechanically independent as regards its operative action from the corresponding elements included in any other of said units; together with traverse means for evenly laying the twisted material and means for driving said traverse means, said driving means being common to a plurality of said units.

41. A twisting machine having a series of groups of twisting elements, each of said groups of elements including means for holding fibrous material, means for receiving fibrous material after being twisted, a driving connection between said holding and receiving means and motor means serving said group, said elements included in any one of said groups being mechanically independent as regards its operative action from said elements included in any other of said groups; together with means for supporting said groups.

42. A twisting machine having a series of groups of twisting elements, each of said groups of elements including means for holding fibrous material, means for receiving fibrous material after being twisted, a driving connection between said holding and receiving means and motor means serving said group, said elements included in any one of said groups being mechanically independent as regards its operative action from said elements included in any other of said groups; together with traverse means for evenly laying the twisted material and means for driving said traverse means, said driving means being common to a plurality of said units.

43. In a machine for twisting fibrous material, the combination of a plurality of twisting units mechanically independent from one another as regards their operative action, each of said units acting to transfer said material from one part of said unit to another part and to twist said material during such transfer; together with traverse means for laying the twisted material and means for driving said traverse means, said driving means being common to a plurality of said units.

44. In an apparatus for twisting fibrous material, a plurality of twisting units, each of said units including motor means and thread friction-roll means serving said unit, the motor means and thread friction-roll means of any one of said units being mechanically independent as regards its operative action from the motor means and thread friction-roll means of any other of said units; together with means for supporting said units.

45. In an apparatus for twisting fibrous material, a plurality of twisting units, each of said units including motor means and thread friction-roll means serving said unit, the motor means and thread friction-roll means of any one of said units being mechanically independent as regards its operative action from the motor means and thread-friction-roll means of any other of said units and each of said units including also a driving connection between its motor means and thread friction-roll means; together with means for supporting said units.

46. In an apparatus for twisting fibrous material the combination of a plurality of twisting units, each of said units including motor means and thread-transferring means serving said unit, the motor means and thread-transferring means of any one of said units being mechanically independent as regards its operative action from the motor means and thread-transferring means of any other of said units and each of said units including also means coöperating with said thread transferring means to vary the amount of twist; with means for actuating said coöperating means.

47. In an apparatus for twisting fibrous material the combination of a plurality of twisting units, each of said units including motor means and thread-transferring means serving said unit, the motor means and thread-transferring means of any one of said units being mechanically independent as regards its operative action from the motor means and thread-transferring means of any other of said units and each of said units including also means coöperating with said thread transferring means to vary the amount of twist; with means for actuating said coöperating means, said twist-varying means being common to a plurality of said units.

48. In an apparatus for twisting fibrous material the combination of a plurality of twisting units, each of said units including motor means and thread-transferring means serving said unit, the motor means and thread-transferring means of any one of said units being mechanically independent as regards its operative action from the motor means and thread-transferring means of any other of said units, and each of said units including also a driving connection between its motor means and thread-transferring means, said connection including a variable speed gear; with means for operating said gears.

49. In an apparatus for twisting fibrous material the combination of a plurality of twisting units, each of said units including motor means and thread-transferring means serving said unit, the motor means and thread-transferring means of any one of said units being mechanically independent as regards its operative action from the motor means and thread-transferring means of any other of said units, and each of said units including also a driving connection between its motor means and thread-transferring means, said connection including a variable speed gear; with means common to a plurality of said units for operating said gears.

50. In a machine for twisting fibrous material, the combination of a plurality of continuously operating twisting units mechanically independent from one another as regards their operative action, each of said units including transferring and twisting means operating on said material at certain speeds and including also means for varying the ratio of the speed of transfer to the speed of twisting; with means for supporting said units.

51. In a machine for twisting fibrous material, the combination of a plurality of continuously operating twisting units mechanically independent from one another as regards their operative action, each of said units including transferring and twisting means operating on said material at certain speeds and including also means for varying the ratio of the speed of transfer to the speed of twisting; with means common to a plurality of said units for actuating said ratio-varying means.

52. In a machine for twisting fibrous material, the combination of a plurality of continuously operating twisting units mechanically independent from one another as regards their operative action, each of said units including twist-varying means; with means for actuating said twist-varying means during running of the machine.

53. In a machine for twisting fibrous material the combination of a plurality of twisting units mechanically independent from one another as regards their operative action, each of said independent units acting to transfer said material from one part of said unit to another part and to twist said material during such transfer, and each of said units including twist-varying means; with means for actuating said twist-varying means during running of the machine.

SEBASTIAN ZIANI DE FERRANTI.

Witnesses:
WILLIAM DUNCAN DAVIDSON,
ALBERT HALL.

Corrections in Reissue Letters Patent No. 13,276.

It is hereby certified that in Reissue Letters Patent No. 13,276, granted July 25, 1911, upon the application of Sebastian Ziani de Ferranti, of Grindleford, England, for an improvement in "Spinning, Twisting, and Doubling Machinery," errors appear in the printed specification requiring correction as follows: Page 4, line 71, for the word "drawing" read *driving;* page 5, line 118, strike out the word "ridged"; same page, line 126, for the word "rigid" read *ridged;* and that the said Letters Patent should be read with these corrections therein that the same may conform to the record of the case in the Patent Office.

Signed and sealed this 17th day of October, A. D., 1911.

[SEAL.]

C. C. BILLINGS,

*Acting Commissioner of Patents.*